(12) United States Patent
Horii et al.

(10) Patent No.: US 9,131,300 B2
(45) Date of Patent: *Sep. 8, 2015

(54) ELECTRONIC DEVICE

(71) Applicant: KYOCERA CORPORATION, Kyoto-shi Kyoto (JP)

(72) Inventors: Seiji Horii, Yokohama (JP); Tomohiro Inagaki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/002,668

(22) PCT Filed: Mar. 27, 2013

(86) PCT No.: PCT/JP2013/002088
§ 371 (c)(1),
(2) Date: Aug. 30, 2013

(87) PCT Pub. No.: WO2013/145738
PCT Pub. Date: Oct. 3, 2013

(65) Prior Publication Data
US 2015/0023531 A1  Jan. 22, 2015

(30) Foreign Application Priority Data

Mar. 28, 2012  (JP) ................ 2012-075124

(51) Int. Cl.
*H04R 1/02* (2006.01)
*H04M 1/02* (2006.01)
(Continued)

(52) U.S. Cl.
CPC ............ *H04R 1/02* (2013.01); *H04M 1/026* (2013.01); *H04M 19/047* (2013.01); *H04R 7/045* (2013.01);
(Continued)

(58) Field of Classification Search
CPC .... H04R 2499/15; H04R 7/045; H04R 17/00; H04R 2440/05; H04R 2499/11
USPC ......................................................... 381/151
See application file for complete search history.

(56) References Cited

U.S. PATENT DOCUMENTS 3,728,741 A   4/1973  Lepor
6,259,188 B1  7/2001  Woodard et al.
(Continued)

FOREIGN PATENT DOCUMENTS

EP  1542064 A1   6/2005
JP  62-086799 U  6/1987
(Continued)

OTHER PUBLICATIONS

An Office Action issued by the Japanese Patent Office on Aug. 28, 2012, which corresponds to Japanese Patent Application No. 2012-148834 and is related to U.S. Appl. Nos. 14/002,357 and 14/002,668.
(Continued)

*Primary Examiner* — Duc Nguyen
*Assistant Examiner* — George Monikang
(74) *Attorney, Agent, or Firm* — Studebaker & Brackett PC

(57) ABSTRACT

According to the present invention, air conduction sound and human body vibration sound (e.g. bone conduction sound) are transmitted to a user without a need for pressing a vibration body itself to an ear. An electronic device 1 of the present invention includes: a panel 10; a housing 60 configured to support the panel 10; and a piezoelectric element 30 attached to the panel 10. The panel 10 is deformed due to deformation of the piezoelectric element 30, and air conduction sound and human body vibration sound are transmitted to an object that is in contact with the deformed panel 10.

17 Claims, 7 Drawing Sheets

(51) Int. Cl.
H04M 19/04 (2006.01)
H04R 17/00 (2006.01)
H04R 7/04 (2006.01)

(52) U.S. Cl.
CPC ............ *H04R 17/00* (2013.01); *H04R 2400/03* (2013.01); *H04R 2499/11* (2013.01); *H04R 2499/15* (2013.01)

(56) References Cited

U.S. PATENT DOCUMENTS

| | | | |
|---|---|---|---|
| 6,427,017 | B1 | 7/2002 | Toki |
| 7,050,600 | B2 | 5/2006 | Saiki et al. |
| 7,174,025 | B2 | 2/2007 | Azima et al. |
| 7,421,088 | B2 | 9/2008 | Cranfill et al. |
| 7,512,425 | B2 | 3/2009 | Fukuda |
| 7,657,042 | B2 | 2/2010 | Miyata |
| 8,199,959 | B2 | 6/2012 | Miyata |
| 8,200,289 | B2 | 6/2012 | Joo et al. |
| 8,279,623 | B2 | 10/2012 | Idzik et al. |
| 8,848,967 | B2 | 9/2014 | Joo |
| 2001/0026625 | A1 | 10/2001 | Azima et al. |
| 2002/0065113 | A1 | 5/2002 | Mori |
| 2002/0067841 | A1 | 6/2002 | Bank et al. |
| 2002/0076061 | A1 | 6/2002 | Ashtiani et al. |
| 2004/0109571 | A1 | 6/2004 | Yoshimine |
| 2005/0002537 | A1 | 1/2005 | Azima et al. |
| 2005/0057527 | A1* | 3/2005 | Takenaka et al. .............. 345/173 |
| 2005/0129267 | A1 | 6/2005 | Azima et al. |
| 2005/0169112 | A1 | 8/2005 | Shimizu |
| 2006/0093165 | A1 | 5/2006 | Kamimura et al. |
| 2006/0140424 | A1* | 6/2006 | Kobayashi .................... 381/190 |
| 2006/0227981 | A1 | 10/2006 | Miyata |
| 2006/0286998 | A1 | 12/2006 | Fukuda |
| 2007/0057909 | A1 | 3/2007 | Schobben et al. |
| 2007/0097073 | A1 | 5/2007 | Takashima et al. |
| 2008/0268921 | A1 | 10/2008 | Taniguchi et al. |
| 2009/0103767 | A1 | 4/2009 | Kuroda et al. |
| 2009/0147969 | A1 | 6/2009 | Kinouchi et al. |
| 2009/0290746 | A1 | 11/2009 | Miyata |
| 2009/0296976 | A1* | 12/2009 | Tsai et al. ..................... 381/386 |
| 2010/0225600 | A1 | 9/2010 | Dai et al. |
| 2010/0278362 | A1 | 11/2010 | Kim |
| 2011/0234459 | A1* | 9/2011 | Yabe .............................. 343/702 |
| 2013/0051585 | A1 | 2/2013 | Karkkainen et al. |
| 2013/0308798 | A1 | 11/2013 | Lee |
| 2014/0342783 | A1 | 11/2014 | Suzuki et al. |

FOREIGN PATENT DOCUMENTS

| | | | |
|---|---|---|---|
| JP | H07-296786 | A | 11/1995 |
| JP | H08-223675 | A | 8/1996 |
| JP | 09-247795 | A | 9/1997 |
| JP | H11-25940 | A | 1/1999 |
| JP | 2001-007546 | A | 1/2001 |
| JP | 2002-027065 | A | 1/2002 |
| JP | 2002-185593 | A | 6/2002 |
| JP | 2002-219413 | A | 8/2002 |
| JP | 2002-232542 | A | 8/2002 |
| JP | 2002-305569 | A | 10/2002 |
| JP | 2004-187031 | A | 7/2004 |
| JP | 2005-214793 | A | 8/2005 |
| JP | 2005-236352 | A | 9/2005 |
| JP | 2005-284054 | A | 10/2005 |
| JP | 2005-348193 | A | 12/2005 |
| JP | 2007-502594 | A | 2/2007 |
| JP | 2007-082009 | A | 3/2007 |
| JP | 2007-180827 | A | 7/2007 |
| JP | 2007-189578 | A | 7/2007 |
| JP | 2008-017398 | A | 1/2008 |
| JP | 2008-270879 | A | 11/2008 |
| JP | 2009-118396 | A | 5/2009 |
| JP | 2011-091719 | A | 5/2011 |
| JP | 2012-148844 | A | 8/2012 |
| JP | 2013-110535 | A | 6/2013 |
| JP | 5255142 | B1 | 8/2013 |
| JP | 2013-207795 | A | 10/2013 |
| JP | 2013-207796 | A | 10/2013 |
| JP | 2013-223238 | A | 10/2013 |
| JP | 2013-232874 | A | 11/2013 |
| JP | 2013-255212 | A | 12/2013 |
| KR | 10-1068254 | B1 | 9/2011 |
| WO | 2004/023199 | A1 | 3/2004 |
| WO | 2004/051967 | A1 | 6/2004 |
| WO | 2006/059679 | A1 | 6/2006 |
| WO | 2006/114985 | A1 | 11/2006 |
| WO | 2012/025783 | A1 | 3/2012 |
| WO | WO2012025783 | * | 3/2012 |

OTHER PUBLICATIONS

An Office Action issued by the Japanese Patent Office on Feb. 5, 2013, which corresponds to Japanese Patent Application No. 2012-148834 and is related to U.S. Appl. Nos. 14/002,357 and 14/002,668.
An Office Action issued by the Japanese Patent Office on Apr. 23, 2013, which corresponds to Japanese Patent Application No. 2012-148834 and is related to U.S. Appl. Nos. 14/002,357 and 14/002,668.
An Office Action issued by the Japanese Patent Office on Aug. 26, 2014, which corresponds to Japanese Patent Application No. 2014-016081 and is related to U.S. Appl. Nos. 14/002,357 and 14/002,668.
An Office Action issued by the Japanese Patent Office on Jul. 31, 2012, which corresponds to Japanese Patent Application No. 2012-148798 and is related to U.S. Appl. Nos. 14/002,675 and 14/002,668.
An Office Action issued by the Japanese Patent Office on Jan. 8, 2013, which corresponds to Japanese Patent Application No. 2012-148798 and is related to U.S. Appl. Nos. 14/002,675 and 14/002,668.
An Office Action issued by the Japanese Patent Office on Apr. 23, 2013, which corresponds to Japanese Patent Application No. 2012-148798 and is related to U.S. Appl. Nos. 14/002,675 and 14/002,668.
An Office Action issued by the Japanese Patent Office on Jul. 31, 2012, which corresponds to Japanese Patent Application No. 2012-148773 and is related to U.S. Appl. Nos. 14/002,699 and 14/002,668.
An Office Action issued by the Japanese Patent Office on Jan. 8, 2013, which corresponds to Japanese Patent Application No. 2012-148773 and is related to U.S. Appl. Nos. 14/002,699 and 14/002,668.
An Office Action issued by the Japanese Patent Office on Jul. 31, 2012, which corresponds to Japanese Patent Application No. 2012-148809 and is related to U.S. Appl. Nos. 14/002,698 and 14/002,668.
An Office Action issued by the Japanese Patent Office on Jan. 8, 2013, which corresponds to Japanese Patent Application No. 2012-148809 and is related to U.S. Appl. Nos. 14/002,698 and 14/002,668.
International Search Report; PCT/JP2013/002789; issued on Jun. 11, 2013, which corresponds to U.S. Appl. Nos. 14/002,357 and 14/002,668.
International Search Report; PCT/JP2013/002530; issued on May 14, 2013, which corresponds to U.S. Appl. Nos. 14/002,675 and 14/002,668.
International Search Report; PCT/JP2013/002874; issued on May 14, 2013, which corresponds to U.S. Appl. Nos. 14/002,699 and 14/002,668.
International Search Report; PCT/JP2013/002138; issued on May 14, 2013, which corresponds to U.S. Appl. Nos. 14/002,698 and 14/002,668.
The extended European search report issued by the European Patent Office on Jun. 11, 2013, which corresponds to European Patent Application No. 13163442.0 and is related to U.S. Appl. Nos. 13/862,333 and 14/002,668.
International Search Report; PCT/JP2013/002088 issued on May 14, 2013.
Japanese Office Action; JP2012-148844; Jul. 31, 2012.
Japanese Office Action; JP2012-148844; Jan. 8, 2013.
An Office Action; "Notice of Reasons for Rejection," issued by the Japanese Patent Office on Aug. 26, 2014, which corresponds to Japanese Patent Application No. 2014-016048 and is related to U.S. Appl. No. 14/002,668; with English language concise explanation.
An Office Action; "Notice of Reasons for Rejection," issued by the Japanese Patent Office on Dec. 2, 2014, which corresponds to Japa-

(56) References Cited

OTHER PUBLICATIONS nese Patent Application No. 2014-016082 and is related to U.S. Appl. Nos. 14/002,675 and 14/002,668; with English language concise explanation.

An Office Action; "Notice of Reasons for Rejection," issued by the Japanese Patent Office on Dec. 2, 2014, which corresponds to Japanese Patent Application No. 2014-016046 and is related to U.S. Appl. Nos. 14/002,698 and 14/002,668; with English language concise explanation.

An Office Action; "Notice of Reasons for Rejection," issued by the Japanese Patent Office on Feb. 10, 2015, which corresponds to Japanese Patent Application No. 2012-089203 and is related to U.S. Appl. Nos. 13/860,150 and 14/002,668; with English language concise explanation.

An Office Action; "Notice of Reasons for Rejection," issued by the Japanese Patent Office on Mar. 17, 2015, which corresponds to Japanese Patent Application No. 2014-016048 and is related to U.S. Appl. No. 14/002,668; with English language concise explanation.

An Office Action; "Notice of Reasons for Rejection," issued by the Japanese Patent Office on Mar. 24, 2015, which corresponds to Japanese Patent Application No. 2012-091021 and is related to U.S. Appl. No. 13/862,333 and U.S. Appl. No. 14/002,668; with English language concise explanation.

* cited by examiner

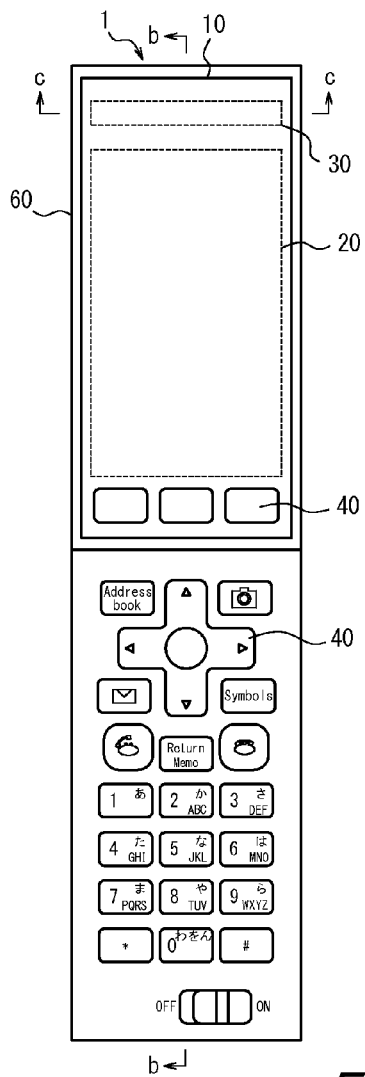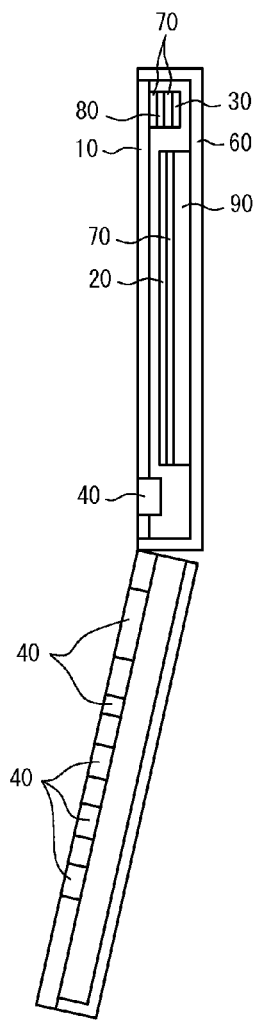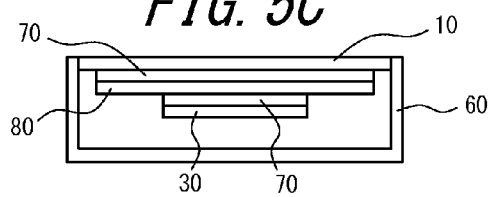

ELECTRONIC DEVICE

CROSS-REFERENCE TO RELATED APPLICATION

This application claims priority to and the benefit of Japanese Patent Application No. 2012-75124 filed on Mar. 28, 2012, the entire contents of which are incorporated herein by reference.

FIELD

The present invention relates to an electronic device that vibrates a panel by applying a predetermined electric signal (i.e. a sound signal) to a piezoelectric element and that transfers the vibration of the panel to a human body to thereby transmit air conduction sound and human body vibration sound to a user.

BACKGROUND

Patent Literature 1 listed below describes an electronic device such as a mobile phone that transmits air conduction sound and bone conduction sound to a user. Patent Literature 1 also describes that the air conduction sound is sound perceived by an auditory nerve of a user as a result of an eardrum being vibrated by an air vibration that is created by a vibration of an object and that travels through an external auditory canal down to the eardrum. Furthermore, Patent Literature 1 describes that human body conduction sound is transmitted to the auditory nerve of the user through a part of a user's body (e.g. a cartilaginous portion of an external ear) that is in contact with the vibrating object.

According to Patent Literature 1, in the described mobile phone, a rectangular plate-shaped vibration body configured by piezoelectric bimorph and a flexible material is attached to an outer surface of a housing via an elastic member. Patent Literature 1 also describes that, upon application of a voltage to the piezoelectric bimorph of the vibration body, the piezoelectric material is expanded and contracted in a longitudinal direction, thereby causing the vibration body to undergo flexture vibration. As a result, when the user places the vibration body in contact with an auricle, air conduction sound and human body conduction sound are transmitted to the user.

CITATION LIST

Patent Literature 1: Japanese Patent Application Publication No. 2005-348193

SUMMARY

In the electronic device described in Patent Literature 1, the vibration body is attached to the outer surface of the housing of the mobile phone or the like. Accordingly, the vibration body projecting from the outer surface of the housing needs to be pressed to an ear, which sometimes causes usability problems.

The present invention is to provide an electronic device that is capable of transmitting air conduction sound and human body vibration sound to a user without the need for pressing the vibration body itself to the ear.

One aspect of the present invention resides in an electronic device that includes: a panel; a housing configured to support the panel; and a piezoelectric element attached to a surface of the panel on an inner side of the housing. The panel is deformed due to deformation of the piezoelectric element, and air conduction sound and human body vibration sound are transmitted to an object that is in contact with the deformed panel.

The piezoelectric element may be attached to the surface of the panel on the inner side of the housing.

A vibration may occur in an area of the panel that is larger than an area having a length corresponding to a distance from an inferior crus of antihelix to an antitragus and a width corresponding to a distance from a tragus to an antihelix of an ear of a human being.

The piezoelectric element may be joined to the panel by a first joining member.

The first joining member may be a non-thermosetting adhesive agent.

The first joining member may be a double-sided adhesive tape.

The panel may be joined to the housing by a second joining member.

The second joining member may be a non-thermosetting adhesive agent.

The second joining member may be a double-sided adhesive tape.

The panel may form a part or an entirety of any of a display panel, an operation panel, a cover panel, and a lid panel that allows a rechargeable battery to be detachable.

When the panel is the display panel, the piezoelectric element may be disposed outside of a display area provided for a display function of the display panel.

The deformation, which causes the transmission of air conduction sound and human body vibration sound, may occur in any areas of the panel.

The panel may include, in areas thereof that are vibrated, a plurality of portions that are configured to be vibrated in a direction intersecting with a surface of the panel, and in each of the plurality of portions, a value indicating an amplitude of the vibration may transition over time from plus to minus or vice versa.

According to an electronic device of the present invention, air conduction sound and human body vibration sound are transmitted to the user without the need for pressing the vibration body itself to the ear.

BRIEF DESCRIPTION OF DRAWINGS

The present invention will be further described below with reference to the accompanying drawings, wherein:

FIGS. 5A-5C illustrate a housing structure of an electronic device according to yet another embodiment;

DESCRIPTION OF EMBODIMENTS

Figure 1:
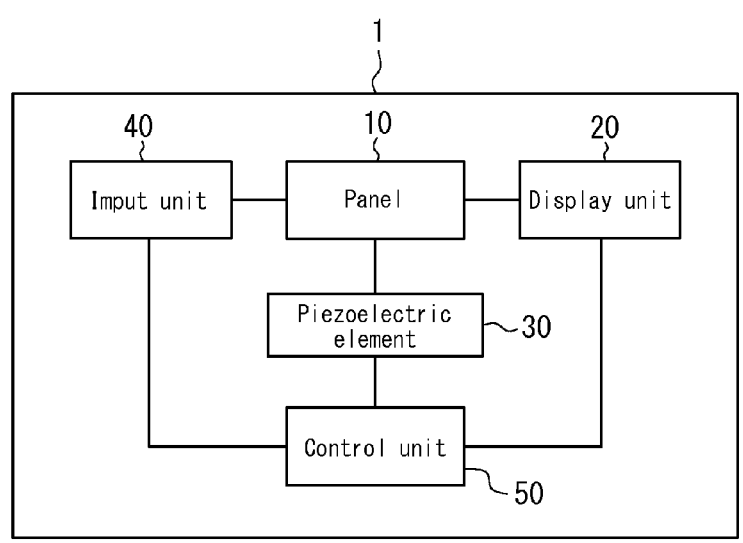
FIG. 1 is a function block diagram of an electronic device according to one embodiment of the present invention.

Embodiments of the present invention will be described with reference to the accompanying drawings. FIG. 1 is a function block diagram of an electronic device 1 according to one embodiment of the present invention. The electronic device 1, which is a mobile phone (smartphone), for example, includes a panel 10, a display unit 20, a piezoelectric element 30, an input unit 40, and a control unit 50.

The panel 10 may be a touch panel configured to detect a contact, a cover panel configured to protect the display unit 20, or the like. The panel 10 may be made of glass or a synthetic resin such as acryl. The panel 10 preferably has a plate shape. The panel 10 may be a flat plate or a curved panel having a gradually inclined surface. When the panel 10 is the touch panel, the panel 10 detects a contact made by a finger of a user, a pen, a stylus pen, or the like. The touch panel may detect a contact using any type, such as the capacitive type, the resistive film type, a surface acoustic wave type (or an ultrasonic type), an infrared type, an electromagnetic induction type, a load detection type, and the like.

The display unit 20 is a display device such as a liquid crystal display, an organic EL display, and an inorganic EL display. The display unit 20 is disposed on a back surface of the panel 10. The display unit 20 may be disposed on the back surface of the panel 10 using a joining member (e.g. an adhesive agent). The display unit 20 may also be adhered to the panel 10 by the joining member (e.g. the adhesive agent). As another example, the display unit 20 may be disposed to be spaced apart from the panel 10 and supported by the housing of the electronic device 1.

The piezoelectric element 30 is an element that is configured to undergo expansion and contraction or bending (flexure) in accordance with an electromechanical coupling factor of a constituent material in response to an electric signal (voltage) applied thereto. As a material of the element, ceramic and crystal are used, for example. The piezoelectric element 30 may be a unimorph, a bimorph, or a laminated piezoelectric element. The laminated piezoelectric element includes a laminated unimorph element in which layers (e.g. 16 or 24 layers) of unimorph are laminated or a laminated bimorph element in which layers (e.g. 16 or 24 layers) of bimorph are laminated. The laminated piezoelectric element is configured by a laminated structure of a plurality of dielectric layers made of PZT (lead zirconate titanate) and electrode layers each disposed between adjacent ones of the dielectric layers, for example. Unimorph undergoes expansion and contraction in response to an electric signal (voltage) applied thereto, and bimorph undergoes bending in response to an electric signal (voltage) applied thereto.

The piezoelectric element 30 is disposed on the back surface of the panel 10 (i.e. a surface of an inner side of the electronic device 1). The piezoelectric element 30 is attached to the panel 10 by a joining member (e.g. a double-sided adhesive tape). The piezoelectric element 30 may be attached to the panel 10 via an intermediate member (e.g. a metal plate). The piezoelectric element 30 is at a predetermined distance from a surface of an inner side of a housing 60 in a state where the piezoelectric element 30 is disposed on the back surface of the panel 10. Preferably, the piezoelectric element 30 remains at a predetermined distance from the surface of the inner side of the housing 60 even in a state where the piezoelectric element 30 undergoes expansion and contraction or flexure. That is to say, the distance between the piezoelectric element 30 and the surface of the inner side of the housing 60 is preferably greater than a maximum amount of deformation of the piezoelectric element 30.

The input unit 40 is configured to receive an operation input from the user and is configured using an operation button (an operation key), for example. When the panel 10 is the touch panel, the panel 10 is also capable of receiving an operation input from the user by detecting a contact made by the user.

The control unit 50 is a processor configured to control the electronic device 1. The control unit 50 applies, to the piezoelectric element 30, a predetermined electric signal (voltage corresponding to a sound signal). The voltage that the control unit 50 applies to the piezoelectric element 30 may be ±15 V which is greater than ±5 V, that is, a voltage to be applied to a so-called panel speaker configured for sound conduction not using human body vibration sound but using air conduction sound. With the above configuration, even when the user forcefully presses the panel 10 against a user's body with force greater than or equal to 3 N or so (e.g. force ranging from 5 N to 10 N), the vibration of the panel 10 occurs. As a result, human body vibration sound which is transmitted through a part of the user's body is generated. Note that a level of the voltage to be applied is appropriately adjustable according to how tightly the panel 10 is fixed to the housing or a support member or according to a capability of the piezoelectric element 30. When the control unit 50 applies an electric signal to the piezoelectric element 30, the piezoelectric element 30 undergoes expansion and contraction or flexure in a longitudinal direction. At this point, the panel 10 attached with the piezoelectric element 30 is deformed in conjunction with expansion and contraction or flexure of the piezoelectric element 30, thus resulting in the vibration of the panel 10. The panel 10 undergoes flexure in response to expansion and contraction or flexure of the piezoelectric element 30. The panel 10 is bent directly by the piezoelectric element 30. The state in which the "panel 10 is bent directly by the piezoelectric element" differs from a phenomenon in which the panel is deformed when a certain area of the panel is vibrated due to inertial force of a piezoelectric actuator including the piezoelectric element provided in a casing as adopted in an existing panel speaker. The state in which the "panel 10 is bent directly by the piezoelectric element" includes a state in which the panel is bent directly by expansion and contraction or bending (flexure) of the piezoelectric element via the joining member or via the joining member and a reinforcing member 80 which is later described. Thus, the panel 10 generates air conduction sound, and the panel 10 also generates human body vibration sound that is transmitted through a part of the body when the user places the part of the body (e.g. the cartilaginous portion of the external ear) in contact with the panel 10. For example, the control unit 50 may apply an electric signal corresponding to a sound signal representing voice of the party on the phone or the like, so as to generate air conduction sound and human body vibration sound that correspond to the sound signal. The sound signal may represent a phone melody, music including a tune, or the like. The sound signal according to the electric signal may be based on music data stored in an internal memory of the electronic device 1 or may be reproduced according to music data stored in an external server and the like via the network.

The vibration is caused in an area of the panel 10 where the piezoelectric element 30 is disposed and in other areas of the panel 10 that are away from the area where the piezoelectric element 30 is disposed. The panel 10 includes, in the areas vibrated, a plurality of portions that are configured to vibrate in a direction intersecting with a main surface of the panel 10, and in each of the plurality of portions, a value indicating an amplitude of the vibration transitions over time from plus to minus or vice versa. The panel 10 is vibrated such that areas with relatively large amplitude of vibration and areas with relatively small amplitude of vibration are seemingly distributed randomly across the panel 10 at a certain moment. In other words, the vibration of a plurality of wavelengths is detected across substantially all areas of the panel 10. In order to prevent the aforementioned vibration of the panel 10 from being attenuated even when the user forcefully presses the panel 10 against the user's body with force ranging from 5 N to 10 N, for example, the voltage that the control unit 50 applies to the piezoelectric element 30 may be ±15 V. The above configuration allows the user to listen to sound while placing the ear in contact with the areas of the panel 10 that are away from the area where the piezoelectric element 30 is disposed.

Figure 2:
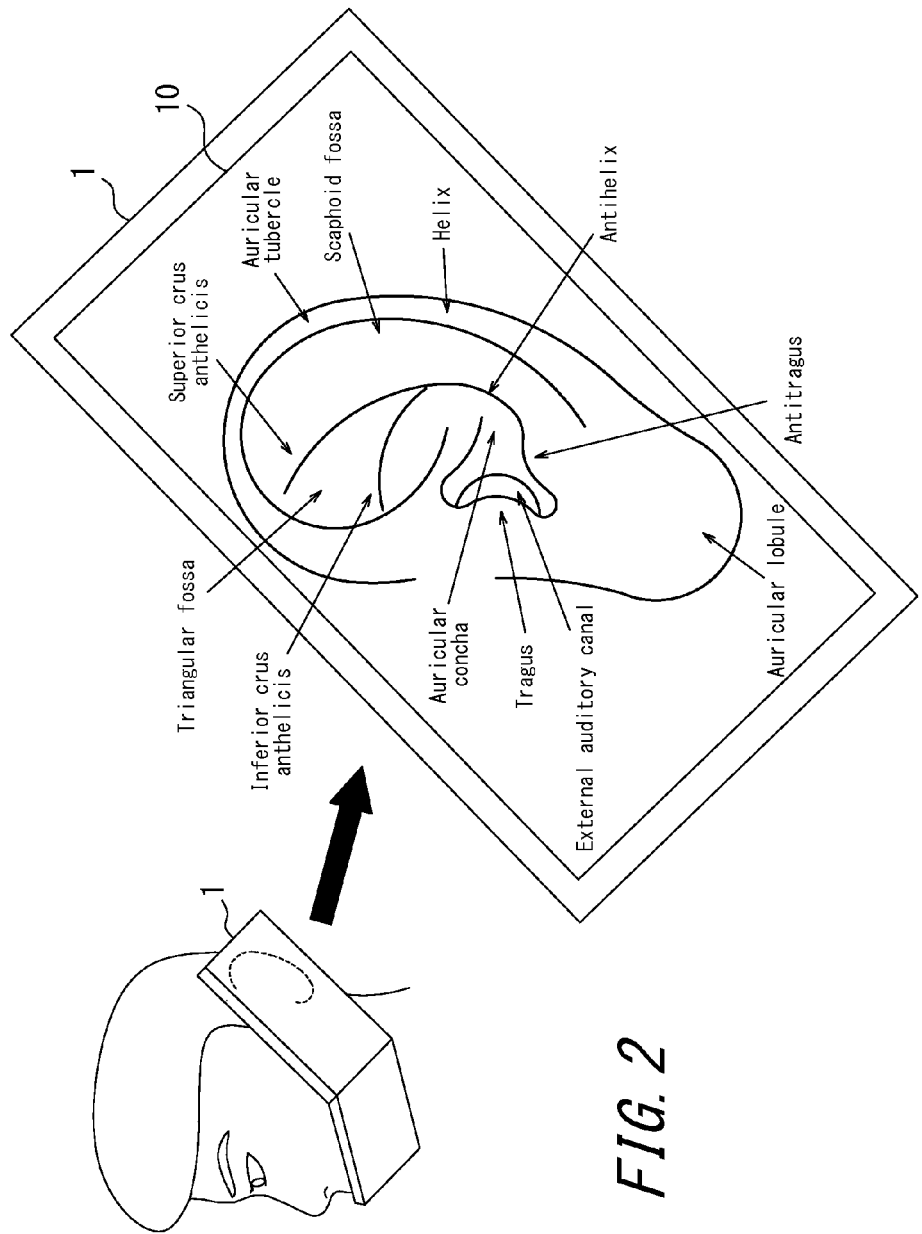
FIG. 2 illustrates a preferable shape of a panel.

It is to be noted that the panel 10 may be as large as the user's ear. As illustrated in FIG. 2, the panel 10 may also be larger than the user's ear. In this case, when the user listens to sound, the whole ear tends to be covered by the panel 10 of the electronic device 1. As a result, ambient sound (noise) is prevented from entering through the external auditory canal. It is suffice for the vibration to occur in an area of the panel 10 that is larger than an area having a length corresponding to a distance from an inferior crus of antihelix (i.e. an inferior crus anthelicis) to an antitragus and a width corresponding to a distance from a tragus to an antihelix. It is preferable for the vibration to occur in an area of the panel 10 that is larger than an area having a length corresponding to a distance from a portion of a helix that is near a superior crus of antihelix (i.e. a superior crus anthelicis) to an auricular lobule and a width corresponding to a distance from the tragus to a portion of the helix that is near the antihelix. The areas having the above lengths and widths may have a rectangular shape or an elliptical shape with a major axis corresponding to the length and a minor axis corresponding to the width. Average ear size of the Japanese can be seen from the Japanese Body Dimension Database (1992-1994) or the like distributed by the Research Institute of Human Engineering for Quality Life (HQL). The panel 10 with a size greater than or equal to the average ear size of the Japanese would be generally capable of covering a whole ear of a foreigner as well.

The above electronic device 1 is capable of transmitting, to the user, air conduction sound and human body vibration sound which is transmitted through a part of the user's body (e.g. the cartilaginous portion of the external ear). Accordingly, when the panel 10 outputs sound at substantially the same volume level as a dynamic receiver, less volume of sound propagates to an external environment of the electronic device 1 due to the vibration of air resulting from the vibration of the panel 10, compared to a case of the dynamic receiver. Accordingly, the electronic device 1 is preferable for a situation where a recorded message is listened to on the train and the like, for example.

Furthermore, since the above electronic device 1 transmits human body vibration sound by the vibration of the panel 10, even when the user wears an earphone or a headphone, the user is able to listen to sound though the earphone or the headphone and a portion of the body by placing the electronic device 1 in contact with the earphone and the headphone.

The above electronic device 1 transmits sound to the user by the vibration of the panel 10. Accordingly, in a case where the electronic device 1 is not provided with an additional dynamic receiver, it is not necessary to provide the housing with an opening (i.e. a sound discharge opening) for sound transmission. As a result, a waterproof structure of the electronic device 1 is simplified. When the electronic device 1 is provided with a dynamic receiver, the sound discharge opening may be closed by a member that passes air through and blocks liquid. The member that passes air through and blocks liquid may be Gore-Tex™, for example.

First Embodiment

Figure 3A:
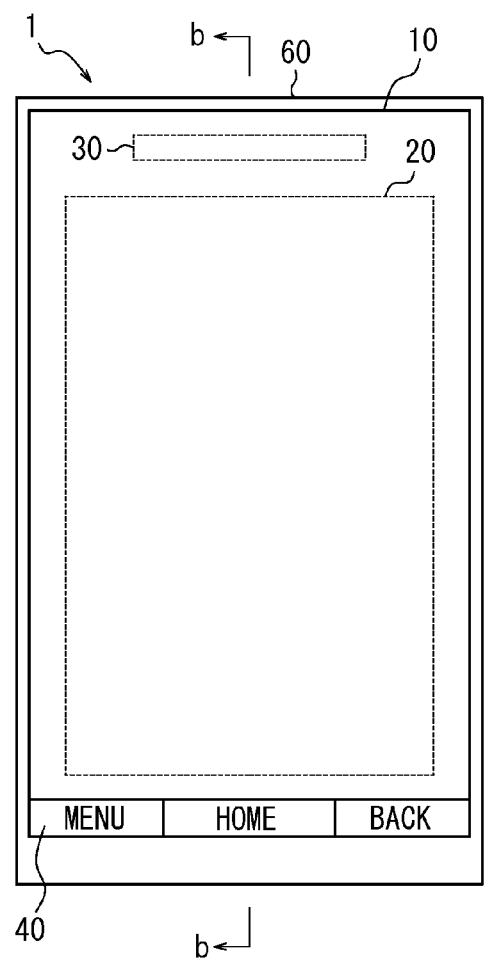
FIGS. 3A and 3B illustrate a housing structure of an electronic device according to another embodiment.
Figure 3B:
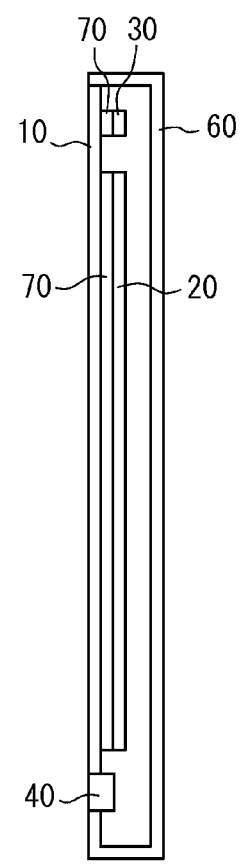

FIGS. 3A and 3B illustrate the housing structure of the electronic device 1 according to a first embodiment. FIG. 3A is a front view, and FIG. 3B is a sectional view taken along a line b-b of FIG. 3A. The electronic device 1 illustrated in FIGS. 3A and 3B is a smartphone in which the touch panel, i.e., a glass plate, is disposed as the panel 10 on a front surface of a housing 60 (e.g. a metal or a resin casing). The panel 10 and the input unit 40 are supported by the housing 60, and the display unit 20 and the piezoelectric element 30 are each adhered to the panel 10 by a joining member 70. Note that the joining member 70 may be the adhesive agent, the double-sided adhesive tape, or the like having thermosetting properties, ultraviolet-curable properties, or the like. For example, the joining member 70 may be an optical elastic resin, which is a colorless and transparent ultraviolet-curable acrylic adhesive agent. The panel 10, the display unit 20, and the piezoelectric element 30 each have a substantially rectangular shape.

The display unit 20 is disposed in substantially a middle of the panel 10 in a short-side direction thereof. The piezoelectric element 30 is disposed near an end of the panel 10 in the longitudinal direction of the panel 10 at a predetermined distance from the end such that the longitudinal direction of the piezoelectric element 30 extends along a short side of the panel 10. The display unit 20 and the piezoelectric element 30 are disposed side by side in a direction parallel to a surface of an inner side of the panel 10.

Figure 4:
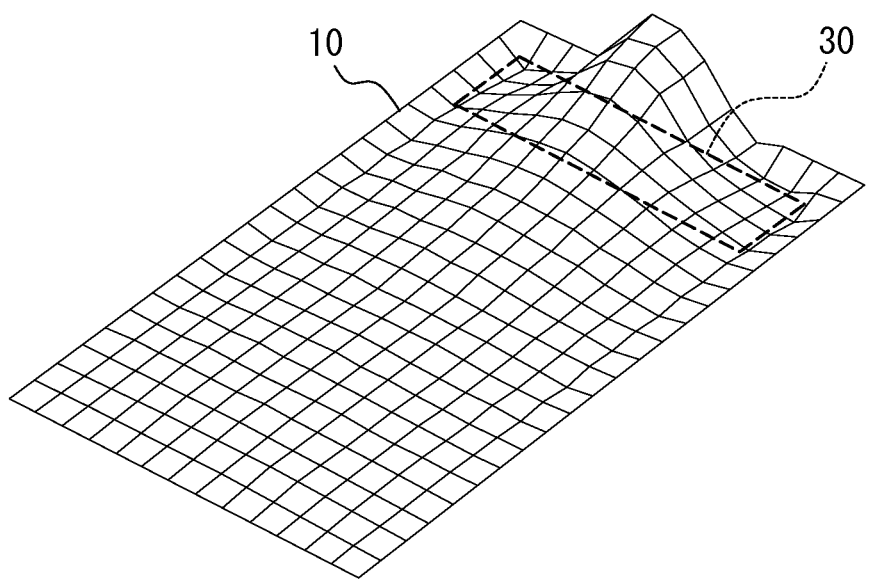
FIG. 4 illustrates one example of a vibration of a panel of the electronic device according to the other embodiment.

FIG. 4 illustrates one example of the vibration of the panel 10 of the electronic device 1 according to the first embodiment. In the electronic device 1 according to the first embodiment, the display unit 20 is attached to the panel 10. Accordingly, the lower portion of the panel 10 is less likely to vibrate compared to the upper portion of the panel 10 attached with the piezoelectric element 30. As a result, in the lower portion of the panel 10, sound leakage due to the vibration occurring in the lower portion of the panel 10 is reduced. The panel 10 in the upper portion thereof is bent directly by the piezoelectric element 30, and the vibration in the lower portion is attenuated compared to the vibration in the upper portion. The panel 10 is bent by the piezoelectric element 30 such that a portion of the panel 10 directly above the piezoelectric element 30 protrudes relative to neighboring portions of the panel 10 in a long-side direction of the piezoelectric element 30.

As described above, according to the electronic device 1 of the present embodiment, the panel 10 is deformed due to deformation of the piezoelectric element 30 attached to the back surface of the panel 10, and air conduction sound and human body vibration sound are transmitted to an object that is in contact with the deformed panel 10. As a result, air conduction sound and human body vibration sound are transmitted to the user without having to protrude the vibration body from an outer surface of the housing 60. Accordingly, usability of the electronic device is improved compared to such an electronic device as described in Patent Literature 1 (Japanese Patent Application Publication No. 2005-348193), by which the user places the vibration body, which is significantly small compared to the housing, in contact with the body. Furthermore, since there is no need for pressing the user's ear to the piezoelectric element itself, the piezoelectric element 30 itself is less likely to be damaged. Moreover, although in a case where not the panel 10 but the housing 60 is deformed the user tends to drop a terminal device while the vibration is generated, such dropping is less likely to occur in the case where the panel 10 is vibrated.

The piezoelectric element 30 is joined to the panel 10 by the joining member 70. The above structure allows attachment of the piezoelectric element 30 to the panel 10 in a manner such that flexibility of deformation of the piezoelectric element 30 is less likely to be limited. The joining member 70 may be a non-thermosetting adhesive agent. The above structure provides an advantage that contraction due to a thermal stress is less likely to occur during curing between the piezoelectric element 30 and the panel 10. The joining member 70 may be the double-sided adhesive tape. The above structure provides an advantage that a contraction stress, which often occurs when the adhesive agent is used, is less likely to be applied between the piezoelectric element 30 and the panel 10.

Second Embodiment

FIGS. 5A-5C illustrate the housing structure of the electronic device 1 according to a second embodiment. FIG. 5A is a front view, FIG. 5B is a sectional view taken along a line b-b of FIG. 5A, and FIG. 5C is a sectional view taken along a line c-c of FIG. 5A. The electronic device 1 illustrated in FIGS. 5A-5C is a foldable mobile phone in which a cover panel (e.g. an acryl plate), which serves as the panel 10 and configured to cover the display unit 20, is provided on a front surface of an upper-side housing 60. In the second embodiment, the reinforcing member 80 is disposed between the panel 10 and the piezoelectric element 30. The reinforcing member 80 may be a resin plate, a metal plate, or a resin plate including glass fiber. That is to say, the electronic device 1 according to the second embodiment has a structure where the piezoelectric element 30 and the reinforcing member 80 are adhered by the joining member 70, and the reinforcing member 80 and the panel 10 are adhered by the joining member 70. Furthermore, in the second embodiment, the display unit 20 is not adhered to the panel 10 but supported by the housing 60. That is to say, the electronic device 1 according to the second embodiment has a structure where the display unit 20 is spaced apart from the panel 10, and the display unit 20 is adhered to the support portion 90, i.e., a part of the housing 60, by the joining member 70. The support unit 90 is not limited to be configured as the part of the housing 60 and may be configured by metal, resin, or the like, as a member independent from the housing 60.

Figure 6:
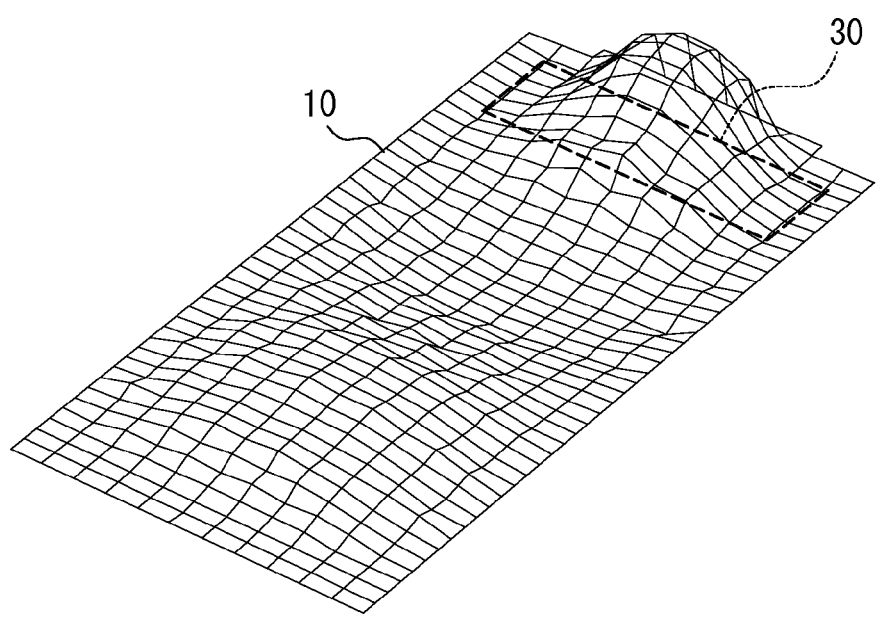
FIG. 6 illustrates one example of a vibration of a panel of the electronic device according to the yet other embodiment.

FIG. 6 illustrates one example of the vibration of the panel 10 of the electronic device 1 according to the second embodiment. Since in the electronic device 1 according to the second embodiment the panel 10 is the acryl plate with lower rigidity compared to the glass plate, and moreover, the display unit 20 is not adhered to the back surface of the panel 10, amplitude generated by the piezoelectric element 30 is larger than the case of the electronic device 1 according to the first embodiment as illustrated in FIG. 4. The vibration is generated in an area of the panel 10 where the piezoelectric element 30 is disposed and in areas of the panel 10 that are away from the disposed area. Accordingly, the user is able to hear air conduction sound transmitted through air and to hear human body vibration sound by placing the ear in contact with any position of the panel 10.

As described above, according to the electronic device 1 of the present embodiment, the reinforcing member 80 and the panel 10 are deformed due to deformation of the piezoelectric element 30 attached to the panel 10 via the reinforcing member 80, and air conduction sound and human body vibration sound are transmitted to an object that is in contact with the deformed panel 10. Accordingly, air conduction sound and human body vibration sound are transmitted to the user without the need for pressing the vibration body itself to the ear. Furthermore, the piezoelectric element 30 is attached to the surface of the panel 10 on the inner side of the housing 60. Accordingly, air conduction sound and human body vibration sound are transmitted to the user without having to protrude the vibration body from the outer surface of the housing 60. Moreover, the deformation occurs in the area of the panel 10 where the piezoelectric element 30 is disposed and in other areas of the panel 10, for transmission of air conduction sound and human body vibration sound. Accordingly, the user is able to hear air conduction sound transmitted through air and to hear human body vibration sound by placing the ear in contact with any position of the panel 10.

Furthermore, by disposing the reinforcing member 80 between the piezoelectric element 30 and the panel 10, when the panel 10 is applied with an external force, the applied external force is less likely to be transferred to the piezoelectric element 30 and damage the piezoelectric element 30. Even when the panel 10 is forcefully pressed against the human body, the attenuation in the vibration of the panel 10 is reduced. Moreover, owing to the reinforcing member 80 disposed between the piezoelectric element 30 and the panel 10, a resonance frequency of the panel 10 is lowered, and an acoustic characteristic in a low frequency band is improved. Note that instead of the reinforcing member 80 a plate-shaped weight may be attached to the piezoelectric element 30 by the joining member 70.

Although the present invention has been described based on the drawings and the embodiments thereof, it should be noted that a person skilled in the art may easily make a variety of modifications and alterations according to the present disclosure. Note that the modifications and alterations are within the scope of the present invention. For example, functions and the like included in the components and steps may be rearranged as long as the functions and the like are logically consistent. A plurality of component parts, the steps, and the like may also be integrated or separated.

Figure 7:
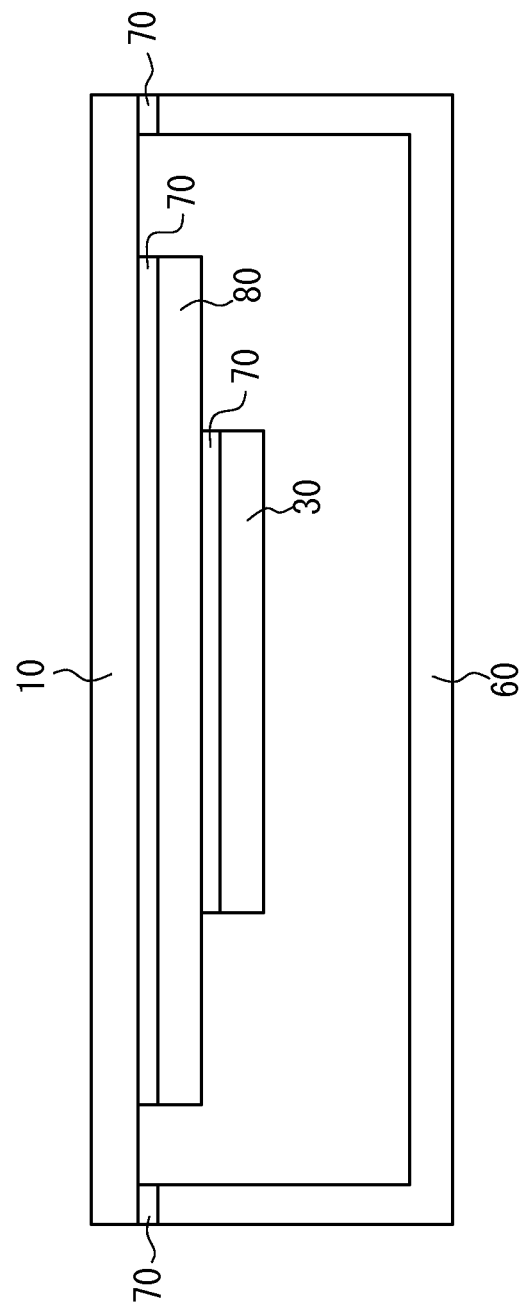
FIG. 7 illustrates one example of joining between a panel and a housing.

For example, as illustrated in FIG. 7, the panel 10 may be configured to be joined to the housing 60 by the joining member 70. By thus preventing the vibration of the panel 10 from being transmitted directly to the housing 60, the risk that the user drops the electronic device 1 is reduced compared to the case where the housing itself undergoes a large vibration. The joining member 70 may be the non-thermosetting adhesive agent. The above structure provides an advantage that contraction due to a thermal stress is less likely to occur during curing between the housing 60 and the panel 10. The joining member 70 may be the double-sided adhesive tape. The above structure provides an advantage that a contraction stress, which often occurs when the adhesive agent is used, is less likely to be generated between the housing 60 and the panel 10.

When the panel 10 and the display unit 20 are not superposed, for example, the piezoelectric element 30 may be disposed in the middle of the panel 10. When the piezoelectric element 30 is disposed in the middle of the panel 10, the vibration of the piezoelectric element 30 is evenly transmitted to the whole panel 10, thereby improving a quality of air conduction sound and allowing the user to perceive human body vibration sound even when the user places the ear in contact with the panel 10 at different positions of the panel 10. Note that, similarly to the first embodiment, the piezoelectric element 30 may be provided in plurality.

Although in the above electronic device 1 the piezoelectric element 30 is adhered to the panel 10, the piezoelectric element 30 may be attached to another place than the panel 10. For example, the piezoelectric element 30 may be adhered to a battery lid that is configured to be attached to the housing 60 to cover a battery. Since the battery lid is often attached to a surface different from the panel 10 in the electronic device 1 such as the mobile phone, the above structure enables the user to listen to sound by placing a portion of the body (e.g. the ear) in contact with the surface different from the panel 10.

The panel 10 may form a part or an entirety of any of a display panel, an operation panel, the cover panel, and a lid panel that allows a rechargeable battery to be detachable. Preferably, when the panel 10 is the display panel, the piezoelectric element 30 is disposed outside of a display area provided for a display function. The above structure provides an advantage that display is less likely to be disturbed. The operation panel includes the touch panel of the first embodiment. The operation panel may also include a sheet key, namely, a component of the foldable mobile phone or the like that is integrally provided with a key top as the operation key and that forms one surface of the housing on an operational side.

Meanwhile, in the first embodiment and the second embodiment, the joining member used for adhering the panel 10 and the piezoelectric element 30, the joining member used for adhering the panel 10 and the housing 60, and the like are denoted by the same reference numeral as the joining member 70. However, the joining members used in the first embodiment and the second embodiment may be different depending on the components to be joined, as appropriate.

REFERENCE SIGNS 1 electronic device
10 panel
20 display unit
30 piezoelectric element
40 input unit
50 control unit
60 housing
70 joining member
80 reinforcing member
90 support portion

The invention claimed is:

1. An electronic device, comprising: a panel; a housing configured to support the panel; and a piezoelectric element attached to the panel, wherein sound is transmitted by bending the panel with the piezoelectric element such that a portion of the panel directly above the piezoelectric element protrudes relative to neighboring portions of the panel in a long side direction of the piezoelectric element and by vibrating a contacting part of a human body that is in contact with the bent panel, and wherein a vibration occurs in an area of the panel that is larger than an area having a length corresponding to a distance from an inferior crus of antihelix to an antitragus and a width corresponding to a distance from a tragus to an antihelix of an ear of the human body.

2. The electronic device of claim 1, wherein
the piezoelectric element is attached to a surface of the panel on an inner side of the housing.

3. The electronic device of claim 1, wherein
the piezoelectric element is joined to the panel by a first joining member.

4. The electronic device of claim 3, wherein
the first joining member comprises a non-thermosetting adhesive agent.

5. The electronic device of claim 3, wherein
the first joining member comprises a double-sided adhesive tape.

6. The electronic device of claim 1, wherein
the panel is joined to the housing by a second joining member.

7. The electronic device of claim 6, wherein
the second joining member comprises a non-thermosetting adhesive agent.

8. The electronic device of claim 6, wherein
the second joining member comprises a double-sided adhesive tape.

9. The electronic device of claim 1, wherein
the panel forms a part or an entirety of any of a display panel, an operation panel, a cover panel, and a lid panel that allows a rechargeable battery to be detachable.

10. The electronic device of claim 9, wherein
the panel comprises the display panel, and
the piezoelectric element is disposed outside of a display area provided for a display function.

11. The electronic device of claim 1, wherein
the deformation, which causes the transmission of air conduction sound and human body vibration sound, occurs in any areas of the panel.

12. The electronic device of claim 1, wherein
the panel includes, in areas thereof that are vibrated, a plurality of portions that are configured to be vibrated in a direction intersecting with a surface of the panel, and in each of the plurality of portions, a value indicating an amplitude of the vibration transitions over time from plus to minus or vice versa.

13. The electronic device of claim 1, wherein
the panel is larger than an ear.

14. An electronic device, comprising: a piezoelectric element; a panel to which the piezoelectric element is joined for vibration; and a housing to which the panel is joined, wherein sound is transmitted by bending the panel with the piezoelectric element such that a portion of the panel directly above the piezoelectric element protrudes relative to neighboring portions of the panel in a long side direction of the piezoelectric element and by vibrating a pressed part of a human body that is pressed against the bent panel, and wherein a vibration occurs in an area of the panel that is larger than an area having a length corresponding to a distance from an inferior crus of antihelix to an antitragus and a width corresponding to a distance from a tragus to an antihelix of an ear of the human body.

15. The electronic device of claim 14, wherein,
when pressed with force greater than or equal to 3 N, the pressed part is vibrated, and sound is transmitted.

16. The electronic device of claim 14, wherein,
when pressed with force greater than or equal to 5 N, the pressed part is vibrated, and sound is transmitted.

17. The electronic device of claim 14, wherein,
when pressed with force less than or equal to 10 N, the pressed part is vibrated, and sound is transmitted.

* * * * *